United States Patent
Mishler et al.

(10) Patent No.: US 10,476,089 B2
(45) Date of Patent: Nov. 12, 2019

(54) REDUCING HEAT LOSS FROM A LIGHTWEIGHT VACUUM INSULATED VESSEL

(71) Applicant: Ardica Technologies, Inc., San Francisco, CA (US)

(72) Inventors: Jeff Mishler, San Francisco, CA (US); Daniel Braithwaite, San Francisco, CA (US); Tibor Fabian, Mountain View, CA (US); Sergio Morales Galvan, Mountain View, CA (US)

(73) Assignee: Ardica Technologies, Inc., San Francisco, CA (US)

( * ) Notice: Subject to any disclaimer, the term of this patent is extended or adjusted under 35 U.S.C. 154(b) by 242 days.

(21) Appl. No.: 15/210,860

(22) Filed: Jul. 14, 2016

(65) Prior Publication Data

US 2017/0018789 A1    Jan. 19, 2017

Related U.S. Application Data

(60) Provisional application No. 62/193,398, filed on Jul. 16, 2015.

(51) Int. Cl.
| | |
|---|---|
| *B32B 3/26* | (2006.01) |
| *H01M 2/16* | (2006.01) |
| *B32B 27/08* | (2006.01) |
| *B32B 27/30* | (2006.01) |
| *B32B 27/32* | (2006.01) |
| *H01M 8/04082* | (2016.01) |

(52) U.S. Cl.
CPC ......... *H01M 8/04208* (2013.01); *Y02P 70/56* (2015.11)

(58) Field of Classification Search
CPC ........ F17C 2203/012; F17C 2203/0391; F17C 2203/0395

See application file for complete search history.

(56) References Cited

U.S. PATENT DOCUMENTS

| | | | | |
|---|---|---|---|---|
| 3,094,071 A | * | 6/1963 | Beckman ................ | F02K 9/605 220/560.11 |
| 2003/0146224 A1 | * | 8/2003 | Fujii .................... | A47J 41/022 220/592.27 |
| 2014/0140919 A1 | * | 5/2014 | Langan ...................... | B01J 7/00 423/648.1 |

FOREIGN PATENT DOCUMENTS

JP        08128950 A   *   5/1996

OTHER PUBLICATIONS

Machine Translation of JP 08-128950A (Jul. 11, 2018).*

* cited by examiner

*Primary Examiner* — Matthew J Merkling
(74) *Attorney, Agent, or Firm* — Carr & Ferrell LLP (57) ABSTRACT

Systems and methods for producing a lightweight vacuum insulated vessel are provided herein. An exemplary vessel is of a non-radially symmetric shape and maintains vacuum pressure between two concentric containers (an inner container and outer container). The vacuum insulated vessel is made to withstand high temperatures in a furnace during manufacture. Further, the vessel may contain a fuel cartridge for a fuel cell system and be insulated to retain heat necessary for the fuel cartridge reactions.

20 Claims, 11 Drawing Sheets

REDUCING HEAT LOSS FROM A LIGHTWEIGHT VACUUM INSULATED VESSEL

CROSS-REFERENCE TO RELATED APPLICATIONS

This application claims the priority benefit of U.S. Provisional Patent Application No. 62/193,398 filed on Jul. 16, 2015 and entitled "Reducing Heat Loss from a Lightweight Vacuum Insulated Vessel". The disclosure of the above-referenced patent application is hereby incorporated by reference in its entirety.

TECHNICAL FIELD

The present invention relates generally to methods for reducing heat loss from a vacuum insulated vessel, and in particular a vessel for a fuel cartridge for a fuel cell system.

BACKGROUND

Fuel cell systems provide a good alternative to fossil fuels as an energy source due to the renewable nature of the fuel and the low carbon footprint of energy production. Fuel cell systems typically include a fuel cell arrangement, which converts a fuel into electricity, and a fuel supply, which supplies fuel to the fuel cell arrangement. In some systems, a fuel generator is preferred as the fuel supply due to the high energy densities of the fuel storage compositions. These fuel generators react a chemical fuel storage composition to produce fuel, wherein the fuel storage composition may be supplied in replaceable cartridges to the fuel generator.

With the increased use of portable devices, portability is also a desirable feature in energy sources. However, to enable portability of a fuel cell system, the fuel cartridges must be limited to a portable size. This requirement limits the amount of fuel storage composition within each cartridge, which, in turn, limits the amount of fuel that may be produced from each cartridge. Thus, there is a need for a portable, lightweight, thin fuel cartridge for energy-dense fuel storage compositions. Accordingly, there is also a need for a portable, lightweight, thin container for holding the fuel cartridge, even during operation when the fuel cartridge can reach high temperatures.

SUMMARY

Disclosed herein are various embodiments for the design and manufacture of a lightweight, thin, non-radially symmetric vacuum vessel, for a fuel cartridge of a fuel cell system. Various vacuum insulated vessel geometries are disclosed, to reduce heat loss and vacuum container deflection during manufacture and operation. Additionally, other mechanisms can be employed to support structural integrity of the vessel under vacuum pressure and at high temperatures, while keeping the vessel lightweight. Further, mechanisms are employed to reduce the amount of heat lost from the fuel cartridge within the vessel to the ambient air outside of the vessel. Strategic placement of standoffs and/or use of getters, along with other mechanisms, help maintain the structural integrity of the vacuum vessel and reduce dissipative, conductive, and radiation heat loss.

Other features, examples, and embodiments are described below.

BRIEF DESCRIPTION OF THE DRAWINGS

Certain embodiments of the present disclosure are illustrated by the accompanying figures. It will be understood that the figures are not necessarily to scale and that details not necessary for an understanding of the disclosure or that render other details difficult to perceive may be omitted. It will be understood that the disclosure is not necessarily limited to the particular embodiments illustrated herein. Embodiments are illustrated by way of example and not by limitation in the figures of the accompanying drawings.

DETAILED DESCRIPTION

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Additionally, ranges described or claimed herein are inclusive of their end points. Moreover, the end points are inclusive of suitable fluctuations allowing for reasonable and approximate values that fall near end points.

Before the present methods, compounds and compositions are disclosed and described, it is to be understood that unless otherwise indicated this invention is not limited to the use of specific reagents, reaction conditions, composition components, or the like, as such may vary. It is also to be understood that the terminology used herein is for the purpose of describing particular embodiments only and is not intended to be limiting. As used in the specification herein, the singular forms "a," "an" and "the" include plural referents unless the context clearly dictates otherwise.

The Fuel Cell System

In various embodiments of the present invention, a fuel cell system functions to produce and convert fuel into electricity. The fuel cell system may be coupled to an external load, such as a consumer portable device, a mobile device, an entertainment device, a vehicle, a battery, or any other suitable power consuming load. The fuel cell system includes a fuel cell arrangement and a fuel generator, wherein the fuel generator accepts a fuel cartridge (also referred to herein as cartridge) containing a fuel storage composition.

The fuel cell arrangement functions to convert fuel into electric power. In various embodiments, the fuel is provided by a fuel generator, a pressurized canister of fuel, or via any other suitable fuel source. The fuel cell arrangement comprises one or more fuel cells coupled in series or in parallel within a fuel cell stack. The fuel cells can be high temperature fuel cells, such as solid oxide fuel cells (SOFCs), molten carbonate fuel cells (MCFCs), low temperature fuel cells (e.g. proton exchange membrane (PEM) fuel cells) or any other suitable fuel cell. The fuel cells convert fuel into electric power, with the fuel coming from a source of hydrogen, butane, propane, methane, or any other suitable fuel source. The fuel cells can be planar, tubular, or of any other suitable shape.

The fuel generator functions to generate and provide fuel for the fuel cell arrangement. The fuel generator is configured to accept a cartridge containing a fuel storage composition, wherein the cartridge removably couples to the fuel generator. In some embodiments, the fuel generator includes a reaction element that reacts with the fuel storage composition. The reaction element may be a heating element (wherein the fuel storage composition endothermically degrades to produce fuel), but may also comprise electrical connections that power heaters within the cartridge or a pump that pumps a reactant to a fuel storage composition reaction front. The fuel generator can be a component within the fuel cell arrangement, or a separate component couplable to the fuel cell arrangement.

In various embodiments, the cartridge includes a casing substantially encapsulating a fuel storage composition. The casing functions to mechanically protect and contain the fuel storage composition. The casing can be either substantially rigid, or flexible, depending on the application for the fuel cell system. The casing can be thermally conductive to facilitate heat transfer from an external heater to the fuel storage composition inside. However, in other embodiments, the casing can be manufactured from a thermally insulative material. Alternatively, portions of the casing may be thermally conductive while other portions may be thermally insulated (e.g. the end of the casing is insulated while the lengthwise surfaces are thermally conductive). In exemplary embodiments, the casing is made of metal, polymer, ceramic, or any suitable material or combination thereof. The casing preferably includes at least one fluid port for egress of produced fuel. The port may or may not include a valve (e.g. an active or passive one-way or multi-path valve).

The fuel storage composition functions to react to produce fuel. In various embodiments, the fuel storage composition is a chemical composition that stores fuel in a chemically bound form. The fuel storage composition produces and releases fuel through thermolysis, hydrolysis, catalytic reaction (e.g. with a solid catalyst), or using any other suitable mechanism. The fuel storage composition preferably releases hydrogen, but may alternatively release methane, propane, butane, or another suitable fuel. The fuel storage composition can be a solid, such as a pill formed from compressed powder (e.g. compression at 40 ton-force), or the fuel storage composition may be a loose powder, a gel, a powder encapsulated in a matrix, or have any other suitable form, in other embodiments. The fuel storage composition may be formed by sintering, extrusion, crystallization, or by utilizing any other suitable manufacturing method. In various embodiments, the fuel storage composition may include alane (aluminum hydride, preferably the alpha-polymorph but alternatively any suitable polymorph), or the fuel storage composition may include sodium borohydride (SBH) or any suitable hydrogen storage composition.

In various embodiments of the present disclosure, the cartridge is removable from the fuel generator, and may also be disposable or recyclable. The cartridge is preferably substantially small so that a user may easily transport spare cartridges. The cartridge may contain enough fuel storage composition for multiple charge cycles (dependent on the charged device and/or fuel cell system), one charge cycle, or even less than a charge cycle.

In operation, the cartridge can be coupled to the fuel generator (e.g. inserted, clipped, screwed, sealed, etc.), wherein the fuel generator heats and thermolyses the fuel storage composition to produce fuel that is then provided to the fuel cell arrangement. Thus, the fuel storage composition is consumed for fuel production; when substantially all of the fuel storage composition within the cartridge is consumed, the spent cartridge must be replaced with a fresh cartridge containing substantially unreacted fuel storage composition. However, the fuel storage composition is oftentimes fully consumed during a charge cycle (e.g. during fuel cell system use), and substantially immediate cartridge exchange may be desired to maintain the charge cycle. However, during operation, the spent cartridge is at a temperature much higher than can easily be handled by the user. By providing a heat insulation mechanism for the fuel cartridge, the exchange mechanism functions to facilitate safe cartridge exchange for the fuel cell system, and in particular a portable fuel cell system.

Reducing Heat Loss with a Vacuum Insulated Vessel

During operation, the fuel storage composition needs to be heated to elevated temperatures to facilitate the chemical reaction to turn the fuel composition into the fuel for the fuel cell. For example, aluminum hydride needs to be heated to about 180 degrees Celsius to facilitate the chemical reaction to generate hydrogen, which is then used as the fuel for the fuel cell. As such, the cartridge materials need to be able to sustain high levels of heat. Simply wrapping the cartridge in insulating materials may work to maintain the temperature of the cartridge without much dissipative heat loss. However, most insulating materials are bulky and thus hinder the application of these cartridges in portable environments. In embodiments of the present disclosure, the fuel cartridge is inserted into a double wall vacuum insulation container, in order to reduce the dissipative heat loss, as shown in exemplary FIG. 1.

Figure 1:
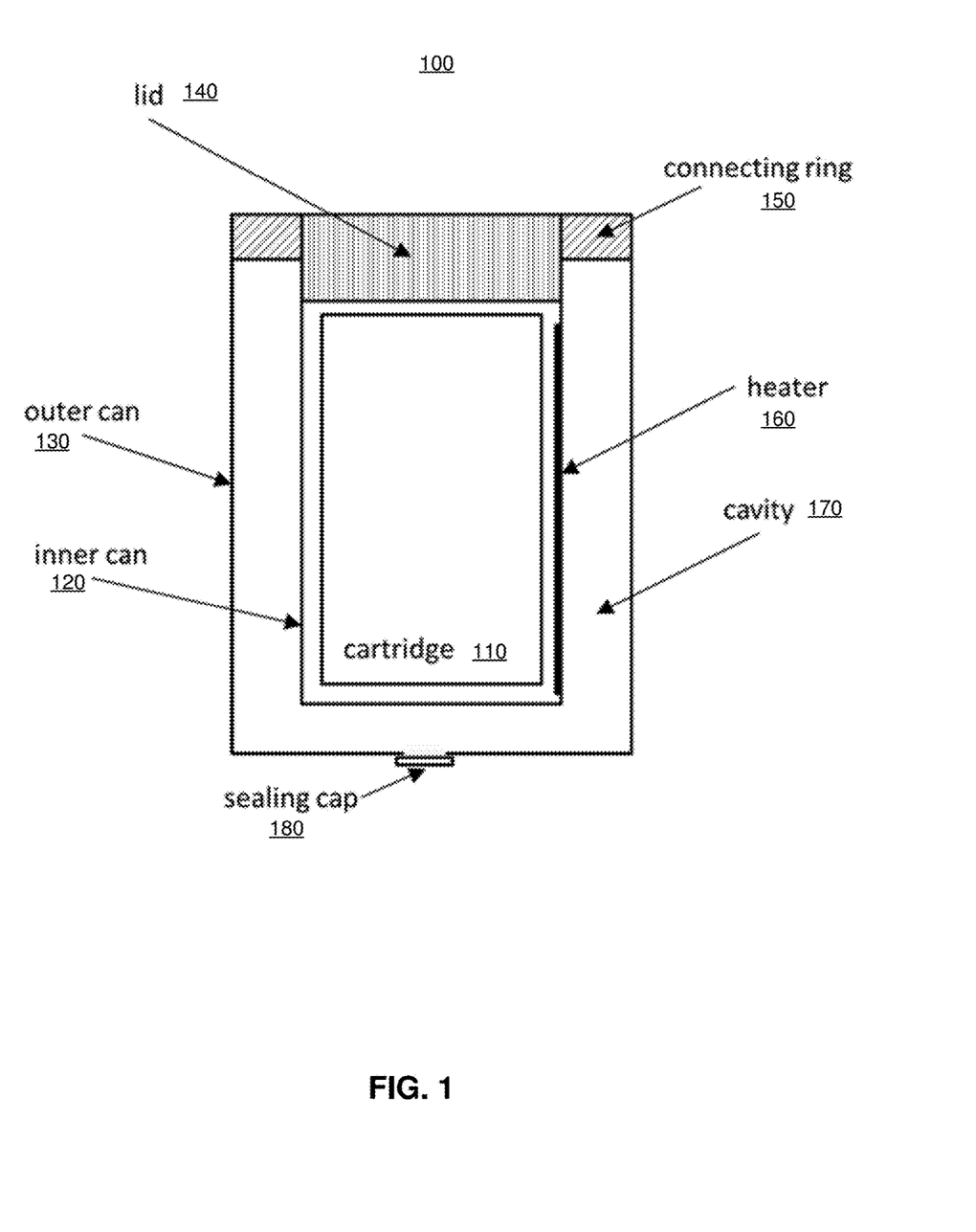
FIG. 1 depicts an exemplary vacuum insulated vessel.

In an exemplary embodiment of the present disclosure, a cartridge 110 (also referred to herein as fuel cartridge) is placed in a container 100 (also referred to herein as vessel, insulated container, vacuum container, vacuum can, enclosed container, and vacuum insulated vessel). The container 100 has an inner wall 120 (also referred to as an inner can), and an outer wall 130 (also referred to as an outer can). The inner wall 120 and outer wall 130 may be joined by a connecting ring 150 that is welded to both surfaces with a brazing material, or connected by other mechanisms. The cartridge 110 may be enclosed in the container 100 by a lid 140, which can have a gasket to avoid fuel loss. Also, the inner can 120, or alternatively the cartridge 110 itself, may contain a heater 160 to heat the fuel storage composition within it to the requisite temperature to facilitate the chemical reaction of turning the fuel storage composition (hydride) into the fuel for the fuel cells.

In exemplary embodiments, heat can escape from the inside of the insulated container 100, through the section of the inner can 120 located between the top of the cartridge 110 and the connecting ring 150. This heat loss is wasted energy that is not used for the electrical load, and requires the heater 160 to generate more heat, in order to maintain the conditions for the fuel storage composition chemical reactions.

In an exemplary embodiment, a fuel composition such as aluminum hydride, needs to be heated to approximately 180-200 degrees Celsius in order to release the hydrogen used for fuel. Some of that heat is lost from the container 100 to the outside through conductive heat loss and radiative heat loss. Conductive heat loss occurs from the fuel cartridge through the inner can and up to the top of the container 100 and out by the connecting ring 150. Mechanisms for reducing the conductive heat loss are discussed herein. Radiative heat loss occurs from heat transfer from the inner can 120 across to the vacuum in the cavity 170 to the outer can 130. Mechanisms for reducing the radiation heat transfer through the cavity 170 are discussed herein.

Manufacture of Vessel

In an exemplary method for manufacturing the vacuum insulated vessel (also referred to herein as container) 100 for the fuel cartridge, the inner can 120, the outer can 130 and the connecting ring 150 with brazing material are loosely assembled and placed in a vacuum oven. First, the vacuum oven is evacuated of air. The gas within the cavity 170 between the inner wall 120 and outer wall 130 is exhausted through a hole in the outer can 130. The temperature in the vacuum oven is then increased to approximately 1,000 degrees Celsius to melt the brazing material and bond the connecting ring 150 to the surfaces of the inner and outer cans. A sealing cap 180 is also brazed onto the hole in the surface of the outer can 130 to trap the vacuum in place.

The vacuum insulated vessel 100 is then cooled back down to room temperature, creating an enclosed container 100 with vacuum pressure in the cavity 170 between the inner wall 120 and outer wall 130. As would be understood by a person of ordinary skill in the art, although the present disclosure refers to a vacuum, the pressure in the cavity 170 may not be at a perfect vacuum (i.e. 0 atm), but instead could have a slight pressure.

Once removed from the vacuum oven, the pressure on the outside of the outer can 130 (and the outside of the inner can 120) is ambient pressure, i.e. approximately 1 atmosphere, while the pressure in the cavity 170 is approximately vacuum pressure (i.e. 0 atmosphere). This pressure differential can cause the material of the cans to collapse or deflect, thereby causing the inner can 120 and outer can 130 to curve towards each other. In a worst case scenario, the inner can 120 and outer can 130 surfaces contact each other, introducing additional pathways for heat to escape, as well as degrading the structural integrity of the container 100. Thus, in order to maintain the structural integrity of the container 100 and the insulating properties of the vacuum insulated vessel 100 for the fuel cartridge 110, the materials and geometric shape of the inner and outer can need to be strong enough to withstand the pressure differential without excessive warping, while still being lightweight, thin and portable to be useful for a portable fuel cell system.

Vacuum Insulated Vessel Shape

FIGS. 2A-2D depict various exemplary cross-sections of a vacuum insulated vessel 100 of a long aspect ratio can, when viewed from the top. In a spherical or long aspect ratio cylindrical shape, the walls of the inner can 120 and outer can 130 generally maintain their shape and are not subject to deflection from the pressure differential operating on the outer can 130. However, in applications with strict thickness limitations (such as for portable fuel cell systems or wearable fuel cell systems), substantially rectangular space is available for fuel storage and the maximum interior volume will be given by a rectangle.

Figure 2A:
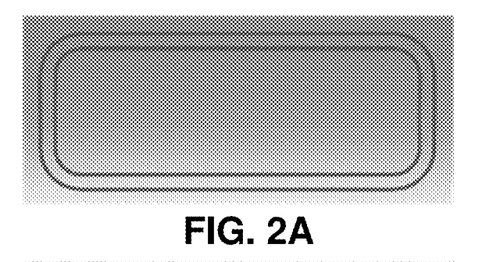
FIGS. 2A-2D depict exemplary cross-sectional views of a vacuum insulated vessel.

A substantially rectangular shape with rounded edges, such as that depicted in FIG. 2A, is one option for the shape of the vessel 100. However, the flat walls of FIG. 2A do not provide much support to withstand the forces acting on them, and thus are not practical in a vacuum container.

Figure 2B:
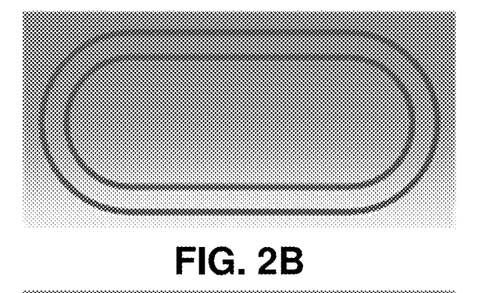

FIG. 2B shows an exemplary cross-sectional view of a vacuum insulated vessel with two flat sides and two rounded sides. This shape could provide enough structural integrity to be strong enough to withstand the pressure differences of a vacuum container by increasing the wall thickness of the materials (i.e. of the inner can 120 and outer can 130). In some embodiments, the inner wall 120 and outer wall 130 can have the same wall thickness. In other embodiments, the wall thickness of the inner can 120 may be less than the wall thickness of the outer can 130. The reduced wall thickness of the inner can 120 can be compensated for in other ways, such as through the use of standoffs, as discussed herein. This reduces the weight of the container 100, and also reduces the cross-sectional area of the container 100, thereby reducing the conductive heat loss. Also, by combining the use of flat sides and rounded sides, the vessel shape provides for a maximization of internal volume for a given thickness, thus allowing more space for the fuel cartridge 110 and other components within the container 100.

Figure 2C:
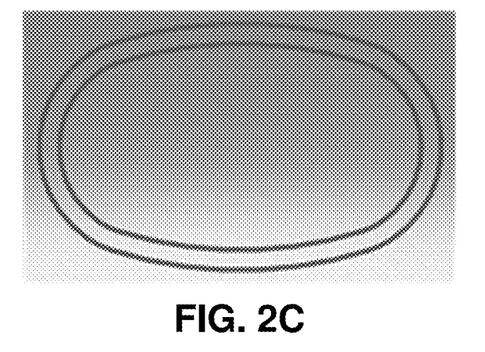

FIG. 2C shows an exemplary cross-sectional view of a vacuum insulated vessel composed of curves of different radius connected tangentially. The curves help to strengthen the walls of the inner can 120 and outer can 130 so they can be made of lesser thickness. This comes at the expense either of increased overall thickness of the vacuum container, or of decreased interior volume.

Figure 2D:
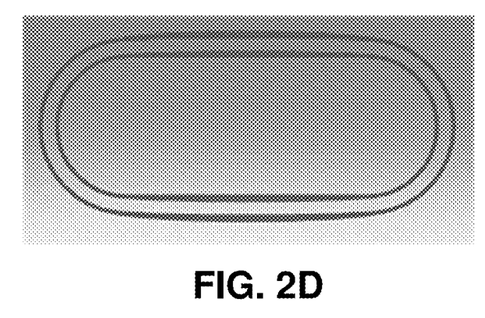

FIG. 2D shows an exemplary cross-sectional view of a vacuum insulated vessel with two flat sides and two round sides, where the flat sides have thicker walls in the middle where the deflection is the highest. The thickness of the inner can 120 and outer can 130 tapers down from the middle of the flat side towards the rounded sides. This design increases the strength of the walls while minimizing the overall increase in weight and thickness of the overall vacuum container for the fuel cartridge.

A summary of designs that have wall thicknesses and geometry to resist the force of vacuum in the cavity 170 and resist the force of gas pressure inside the reaction chamber is presented below in Table 1:

TABLE 1

| | Weight [g] | Inner Can Lip Cross-Sectional Area [mm$^2$] |
|---|---|---|
| FIG. 2B: flat sides | 310 | 89 |
| FIG. 2B: flat sides and thinned upper lip | 306 | 45 |
| FIG. 2D: thickened flat sides | 252 | 73 |
| FIG. 2D: thickened flat sides and thinned upper lip | 249 | 44 |

The inner can lip cross-sectional area determines the amount of conductive heat loss from the vacuum container. Minimizing this value reduces the amount of conductive heat loss from the vacuum container, which is an objective of the present disclosure.

Further, as is shown from Table 1, the designed shape of the vacuum container affects the total weight of the vacuum container. Thus, to reduce the weight of the vacuum container (to enhance portability of the fuel cell devices), the shape of the container 100 can be altered. In order to increase the portability of the fuel cell devices, it is important to reduce the weight of the materials as well, including the vacuum container. A deciding factor of the material of the vacuum container is the stiffness of the wall material which must resist the pressure forces applied to it. Suitable materials may include titanium, stainless steel, and other similar compounds. Titanium has a low density and lower thermal conductivity. Although it has a lower intrinsic stiffness, the total stiffness of the design can still be sufficient if the walls of the inner can 120 and outer can 130 are made thicker. Also, due to the lower density of titanium, the design is still in total much lighter than a vacuum container made entirely of stainless steel.

Figure 3A:
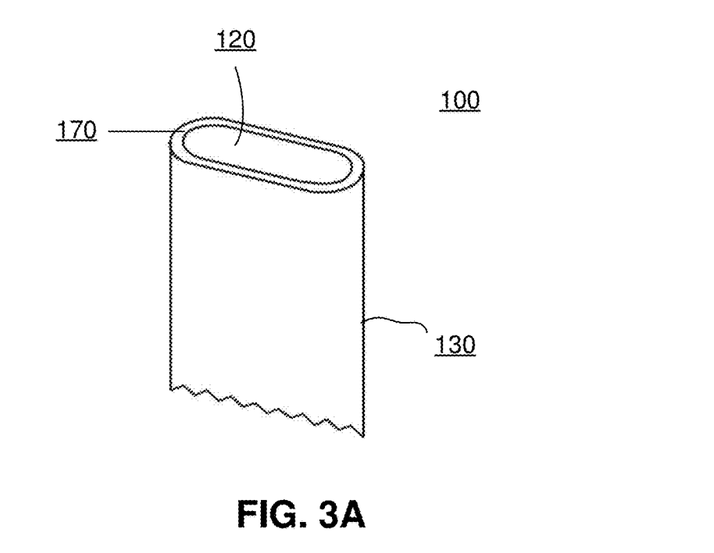
FIG. 3A depicts an exemplary outer view of a vacuum insulated vessel.

In an exemplary embodiment depicted in FIG. 3A, the wall thickness of the inner can 120 and/or the outer can 130 is 0.8 mm. The thicker wall thickness decreases the amount of deflection within the vacuum container 100, but at the expense of increased weight of the container 100 and increased heat loss. As would be understood by a person of ordinary skill in the art, although an exemplary wall thickness of 0.8 mm is described herein, the wall thickness may be higher or lower in various embodiments, including being within a range of approximately 0.5 mm-1.3 mm. Further, the wall thickness is a function of the material and desired weight and heat loss reducing effects.

Figure 3B:
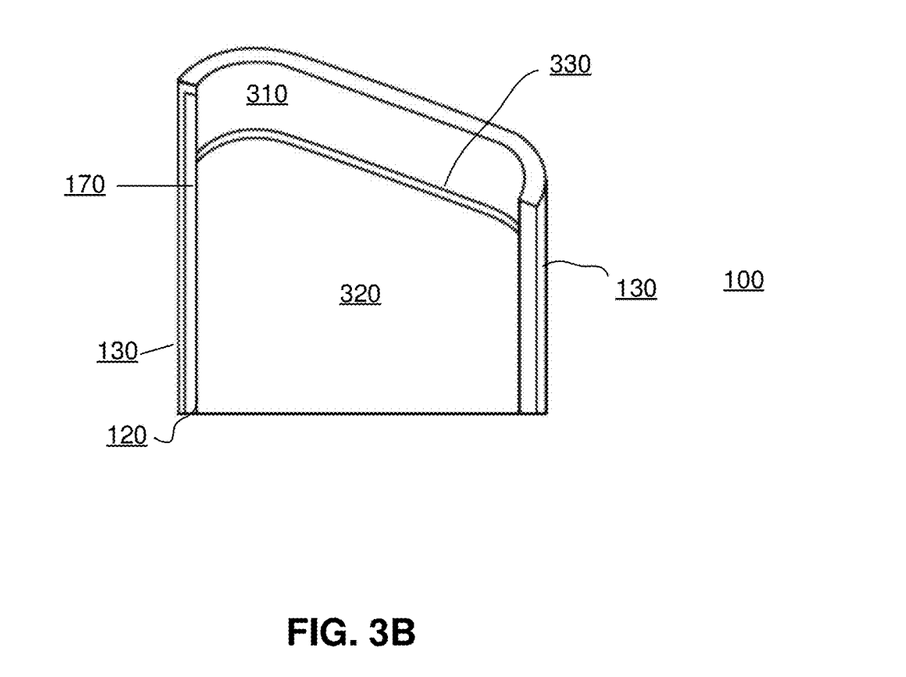
FIG. 3B depicts an exemplary inner view of a vacuum insulated vessel.

FIG. 3B depicts an exemplary partial view of another embodiment of container 100. In this embodiment, a wall thickness of 0.8 mm for the inner can 120 and/or the outer can 130 is used. However, to reduce conduction heat loss and weight, an upper lip portion 310 of the inner can 120 may be thinned, from the top of the inner can 120 to the divider 330. The upper lip portion 310 is of less thickness than a lower portion 320 of the inner can 120. By having a thinner upper lip portion 310 of the inner can 120, this reduces the heat conduction from the hot inner can 120 to the connecting ring 150 that joins it to the outside environment. As would be understood by a person of ordinary skill in the art, although an exemplary wall thickness of 0.8 mm is described herein, the wall thickness may be higher or lower in various embodiments. Further, the wall thickness is a function of the material and desired weight and heat loss reducing effects.

By increasing the wall thickness of the main body of the inner can, the stability of the can is increased. Creating a non-uniform wall thickness of the inner can of the vacuum insulation allows the top of the inner can to be thinner to minimize the conduction heat loss from the inner can to the outer can. Furthermore, the radiation losses from the vacuum container are reduced by use of low emissivity coatings on the inner can, or by wrapping the inner can in a smooth covering of aluminum foil or stainless steel foil.

Application of Standoffs

In various embodiments of the present disclosure, one or more standoffs 410 can be placed in the cavity 170 between the inner can 120 and outer can 130, to provide additional support to help resist wall deflection when the container 100 is at vacuum pressure. Standoffs can be made of varying shapes, sizes, and materials. In an exemplary embodiment depicted in FIG. 4, a standoff is a spherical ball. The ball shape of the standoff minimizes the contact area to each can (i.e. the inner can 120 and the outer can 130), and minimize the intrinsic thermal conductivity of the standoff material itself, thus reducing heat loss from the vessel 100. In an exemplary embodiment, standoff 410 is a ceramic ball with a diameter of 1.3 mm.

Figure 4:
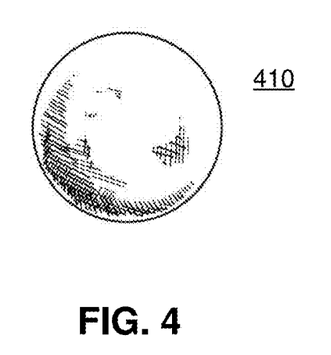
FIG. 4 depicts an exemplary standoff for use in a vacuum insulated vessel.

The standoff 410 is made from a material with low thermal conductivity in order to maintain the thermal isolation between the inner can 120 and outer can 130. In one embodiment, a zirconia ceramic ball is used as a standoff. The zirconia ceramic ball has low thermal conductivity properties and is also compatible with a vacuum. Furthermore, the zirconia material is robust enough to be thermally stable in the high temperatures of the vacuum container (~1,000° C.), as well as stable enough to not outgas into the vacuum space of the cavity 170 in which it is installed. As would be understood by persons of ordinary skill in the art, other suitable materials may also be used for the standoff 410.

Figure 5:
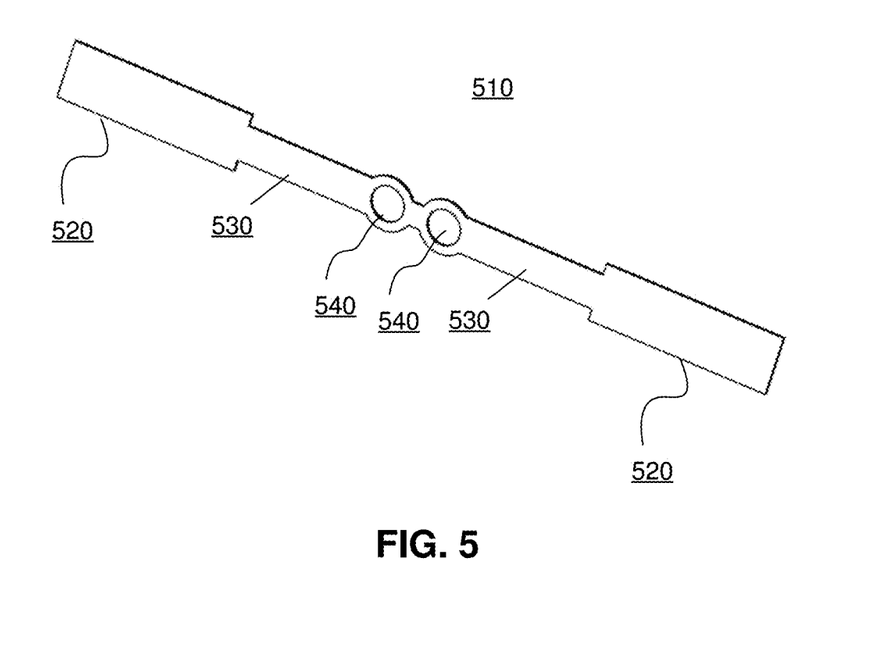
FIG. 5 depicts an exemplary standoff holder for use in placing a standoff in a vacuum insulated vessel.

In an exemplary embodiment, a zirconia ceramic ball acting as a standoff 410 is held in place with a standoff holder 510, of which an exemplary depiction is found in FIG. 5. A standoff holder 510 can be made of a thin strip of stainless steel foil, or other suitable material. The standoff holder 510 is used to position the standoff 410 and hold it in place on the outer surface of the inner can 120 of the container 100.

The standoff holder 510 may be composed of two tab portions 520, two thin portions 530, and two circular areas 540 to retain the standoff 410. The circular areas 540 encapsulate the spherical standoff. The thin portions 530 are wide enough to ensure that the standoff can be handled, but the width is minimized to minimize the amount of material used and thus further minimize heat transfer. The tab portions 520 are used for handling the standoff holder 510, but are removed from the final assembly. Through the use of one or more standoffs, the walls of the inner can 120 and/or outer can 130 can be made even thinner, as the standoffs help support the structural integrity of the container 100.

In an exemplary embodiment, circular area 540 of the standoff holder 510 is a hole drilled into the standoff holder 510 of 1.2 mm diameter. The hole is large enough to ensure that the standoff 410 can stick through the hole, but small enough to be able to enclose and support the standoff 410. As understood by persons of ordinary skill in the art, the circular area 540 may be of larger or smaller size for a different size standoff 410. While a thin strip of stainless steel foil is shown in the exemplary figures, the strip for the standoff holder 510 can be made of any material that is compatible to weld with the surface of the inner can 120. In exemplary embodiments, the tab portion 520 of the standoff holder 510 may be approximately 3 mm in width. The standoff holder 510 may be of 0.001" thickness.

Figure 6A:
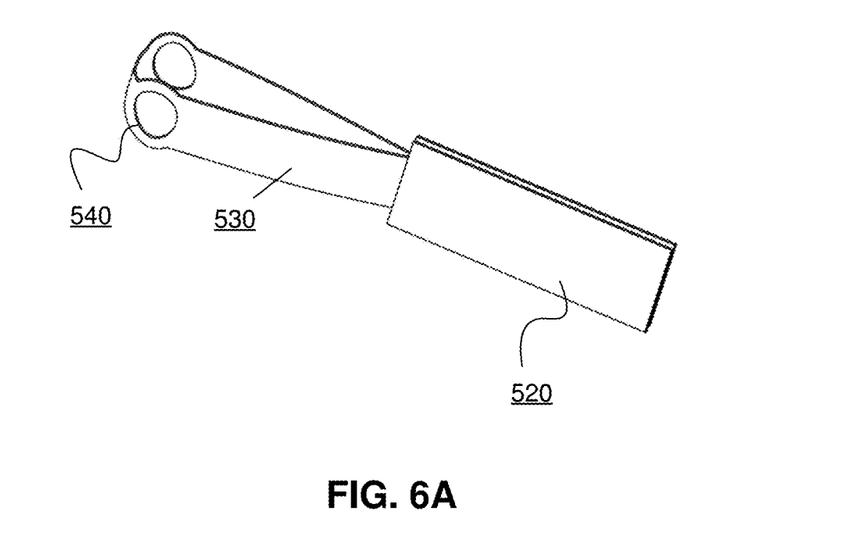
FIGS. 6A-6B depict exemplary views of a standoff holder for use in placing a standoff in a vacuum insulated vessel.
Figure 6B:
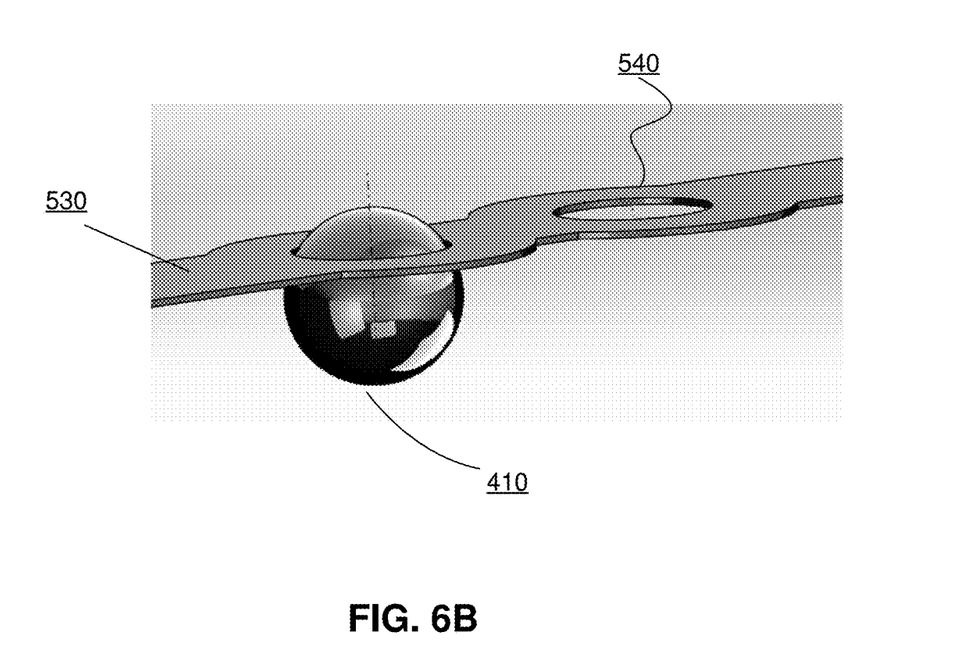

The standoff holder 510 can be folded over to encircle a standoff 410, as shown in FIG. 6A. The standoff holder 510 captures the standoff 410 and holds it in place, as shown in the partial view of FIG. 6B. The standoff 410 partially goes through the circular area 540 of the standoff holder 510. In this way, only the standoff 410 touches the surface of the outer can 130, i.e., no portion of the standoff holder 510 makes contact with the outer can 130. The standoff holder 510 may have higher thermal conductivity than the standoff 410 itself. Thus to minimize heat transfer, the standoff holder 510 does not come in contact with any hot surface, such as the surface of the inner can 120 or outer can 130.

Figure 7:
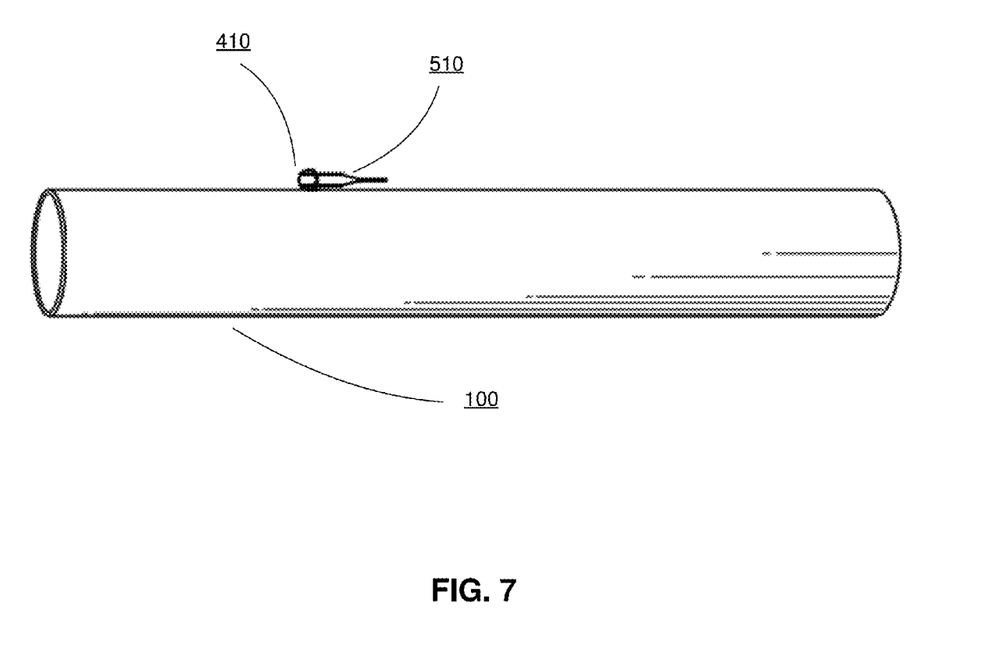
FIG. 7 is an exemplary view of an inner can with a standoff attached to an outer surface.

The ball assembly with the standoff 410 within the standoff holder 510 can be welded onto an outer surface of the inner can 120, as depicted in the exemplary embodiment of FIG. 7. The tab portion 520 is removed after placement on the inner can 120.

Figure 8:
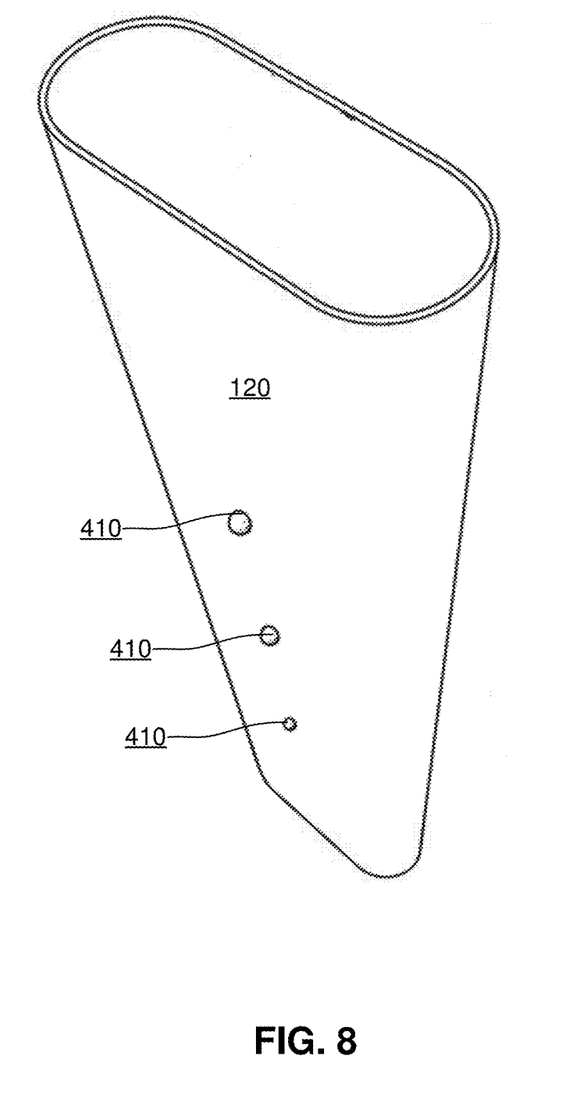
FIG. 8 is an exemplary side of a vacuum insulated vessel with standoffs attached.

FIG. 8 depicts an exemplary embodiment of container 100 after standoffs 410 have been welded onto the inner can 120 (the outer can 130 is not depicted in the figure). In an exemplary embodiment, a container 100 may have six ball assemblies welded onto the inner can 120, three on each side of the inner can 120. The ball assemblies may be spaced out along a centerline of the flat face. In one example, the ball assemblies are placed along a centerline of the inner can 120 at 55 mm, 86 mm, and 123 mm from the bottom of the can. In other embodiments, fewer or additional ball assemblies may be used. Also, the ball assemblies may be applied at other locations on the can.

As shown in FIG. 8, an exemplary side profile view of standoffs, the standoffs protrude from the surface of the inner can 120. When the inner can 120 is combined with the outer can 130, the standoffs will prevent the inner can 120 from touching the outer can 130, even though the walls may not be stiff enough by themselves to resist the forces of the gas and vacuum pressure acting on them. The standoffs 410 essentially create a thermal bridge between the inner can 120 and outer can 130 across the vacuum that is present in the cavity 170 of the container 100.

With the use of standoffs, the overall weight of the insulated vessel can be lowered while still maintaining high performance. For example, by using standoffs, the wall thickness of the inner can 120 and/or outer can 130 can be reduced, such that an overall weight of the insulated vessel drops from 310 g down to 203 g. Also, the inner can lip cross-sectional area is reduced from 89 mm$^2$ to 56 mm$^2$, as depicted in Table 2 below:

TABLE 2

|  | Weight [g] | Inner Can Lip Cross-Sectional Area [mm$^2$] |
| --- | --- | --- |
| FIG. 2B, but with thinner flat sides and standoffs | 203 | 56 |

Figure 9:
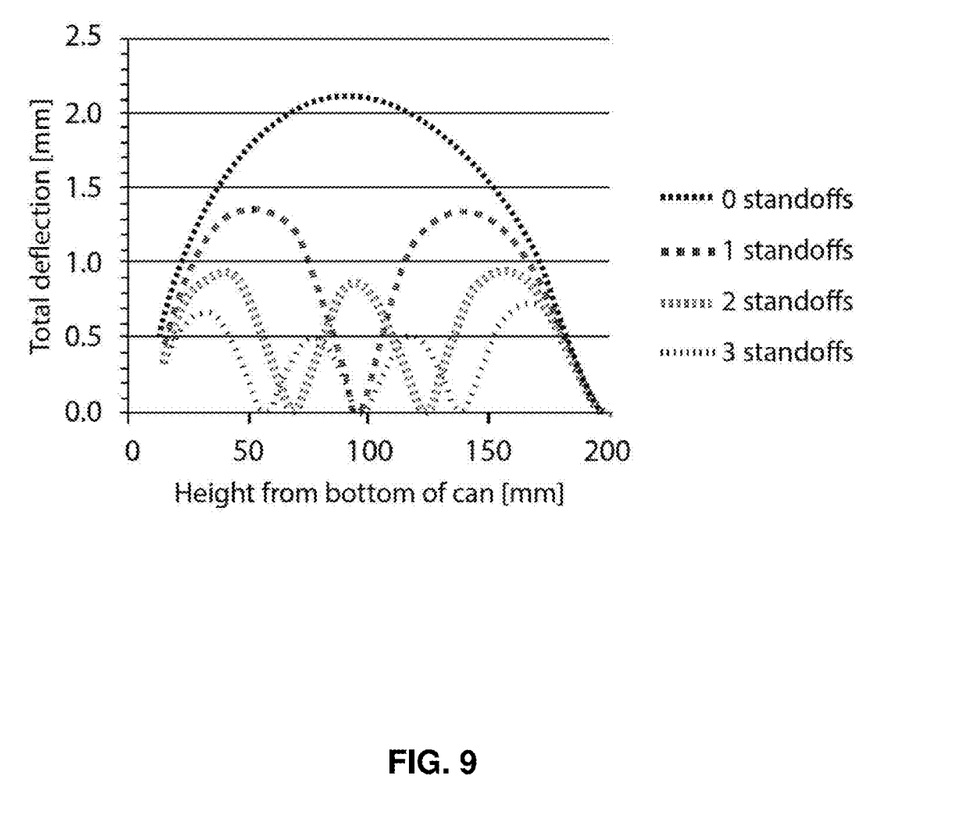
FIG. 9 is an exemplary analysis of the use of standoffs on the vacuum insulated vessel.

The number and locations of standoffs placed on the inner can 120 is an important parameter for the design. For a can design with the same internal shape, but where the wall thickness is reduced to 0.55 mm, an analysis was conducted that models the standoffs as rigid cylinders that touch the inner and outer cans at the middle of the flat side of the cans. With this analysis, the optimal vertical location(s) of the standoffs to reduce the maximum total wall deflection can be determined. FIG. 9 shows one such analysis that was conducted with 0-3 standoffs. As depicted in the figure, with 0 standoffs, the inner and outer cans are predicted to deflect towards each other by 2.1 mm. In an exemplary embodiment, the gap in the cavity 170 between the inner can 120 and outer can 130 is 1.5 mm, so the walls of the inner and outer cans would be expected to touch. For 1 standoff, the total deflection is reduced to 1.4 mm. This is less than the designed gap in the cavity 170, but does not leave much leeway in case of manufacturing tolerances and error in the analysis. Having two standoffs reduces the deflection to 0.9 mm, and having three standoffs reduces deflection to 0.7 mm.

By using the standoffs between the inner can 120 and outer can 130, a thin wall vacuum assembly with internal supports can be manufactured, for a thin, lightweight, and portable vacuum insulated vessel for a fuel cartridge for a fuel cell system. The high performance, lightweight, and thin insulation within a small space facilitate the portability of fuel cell systems while also reducing heat losses to maintain the efficiency of the system. Furthermore, the combination of round walls and flat walls of the can shape optimizes the internal volume for a given thickness of the vacuum container, providing the volume benefits of the flat geometry with the structural integrity of spherical geometry. Using these methods, products such as fuel storage compositions can be built into thin and light devices.

Another factor affecting the heat loss from the vacuum container is the surface emissivity. Low surface emissivity on surfaces of the inner can 120 and outer can 130 minimizes the heat losses from the walls. Having a rough surface increases the surface area which increases the emissivity. A smooth surface means less surface area which reduces the emissivity. As such, the surfaces of the inner and outer can walls are smooth (almost mirror-like) and polished, in various embodiments. In particular, the outer surface of the inner can 120 and inner surface of the outer can 130 (i.e. wall surfaces surrounding the cavity 170) are smoothed.

Machining leaves a polished surface, but the surface can become oxidized, leading to high radiation heat losses. Materials with high electrical conductivity (such as copper, gold, silver, aluminum, etc.) have low emissivity and thus make good candidates for wall surfaces. Using a material that already has low emissivity can obviate the need for finishing processes such as plating and polishing of the inner can surface.

In exemplary embodiments, stainless steel foil is wrapped around the outer surface of the inner can 120. The stainless steel is a relatively inexpensive material and has low emissivity. Furthermore, straight walls are preferable in order to easily put in and remove solid objects from the interior of the inner can 120. Stainless steel foil can be manipulated into this configuration.

In exemplary embodiments, the stainless steel foil can be welded to the inner can because the walls of the inner can are flat and don't have attachment points. Welding also ensures that the foil has a minimal gap with the inner can. Further, stainless steel foil can be welded to a stainless steel can. Additionally, stainless steel foil has a melting point above most brazing temperatures, and thus is compatible with the exemplary vacuum brazing processes for manufacturing the vacuum insulated can. Since stainless steel foil is inexpensive, it provides an inexpensive alternative to the finishing processes that would need to be done to the can surface to achieve similarly low emissivity. With the stainless steel foil covering of the vacuum container, radiation heat loss from the vacuum container is reduced, thereby allowing the stainless steel foil sheet to effectively act as a radiation shield.

In some embodiments, the inner can 120 may be wrapped in a material, such as stainless steel foil, prior to, or after welding the standoff ball assembly onto it. An inner surface of the outer can 130 may also be covered with the stainless steel foil.

In other embodiments, copper plating may be used instead of, or in combination with, stainless steel foil. This material may be used to cover an inner surface of the outer can 130 and/or an outer surface of the inner can 120. Copper is shinier than stainless steel and is thus more reflective, resulting in less heat transfer. By reducing heat transfer from the walls surrounding the cavity 170, less heat is moved through the cavity and released from the container 100.

Further, copper plated surfaces may reduce the radiative heat loss from the inner can 120. By having copper plating facing the cavity 170 of where the vacuum is present, the radiation heat transfer through the cavity 170 is reduced. As would be understood by a person of ordinary skill in the art, other suitable materials may be also used for covering the outer surface of the inner can, and/or the inner surface of the outer can.

Application of Getters

Once a vacuum is achieved within the cavity 170 of the container 100, it is also important to maintain that vacuum pressure. Ideally, the pressure within the cavity is a perfect vacuum (0 atm), but can also be as high as 0.0001 atm. However, achieving and maintaining such low pressure over time can be problematic. One barrier to vacuum pressure is the absorption of gases on the wall surfaces surrounding the cavity 170. Over time, these gases are released from the wall surfaces into the cavity 170 and degrade the vacuum.

In various embodiments of the present disclosure, getters are welded onto the outer surface of the inner can. These getters absorb various gases and remove them from the surrounding atmosphere, thus assisting in achieving and maintaining a high quality vacuum within the cavity 170.

A certain capacity of getters is needed to ensure that sufficient gases are absorbed from the atmosphere within the cavity 170 to maintain the pressure. Further, a certain getter capacity is needed to achieve the desired level of gas absorption within a certain time frame. A desired getter capacity determines a number and format of getters that are used. The desired getter capacity can be determined based at least in part on the surface area of the wall surfaces surrounding the cavity 170, an assumption as to the amount of gases absorbed on those wall surfaces, an assumed leak rate, and desired time frame for maintaining the vacuum. In an exemplary embodiment, a vacuum is desired to be maintained within the cavity 170 for 1-5 years.

Figure 10:
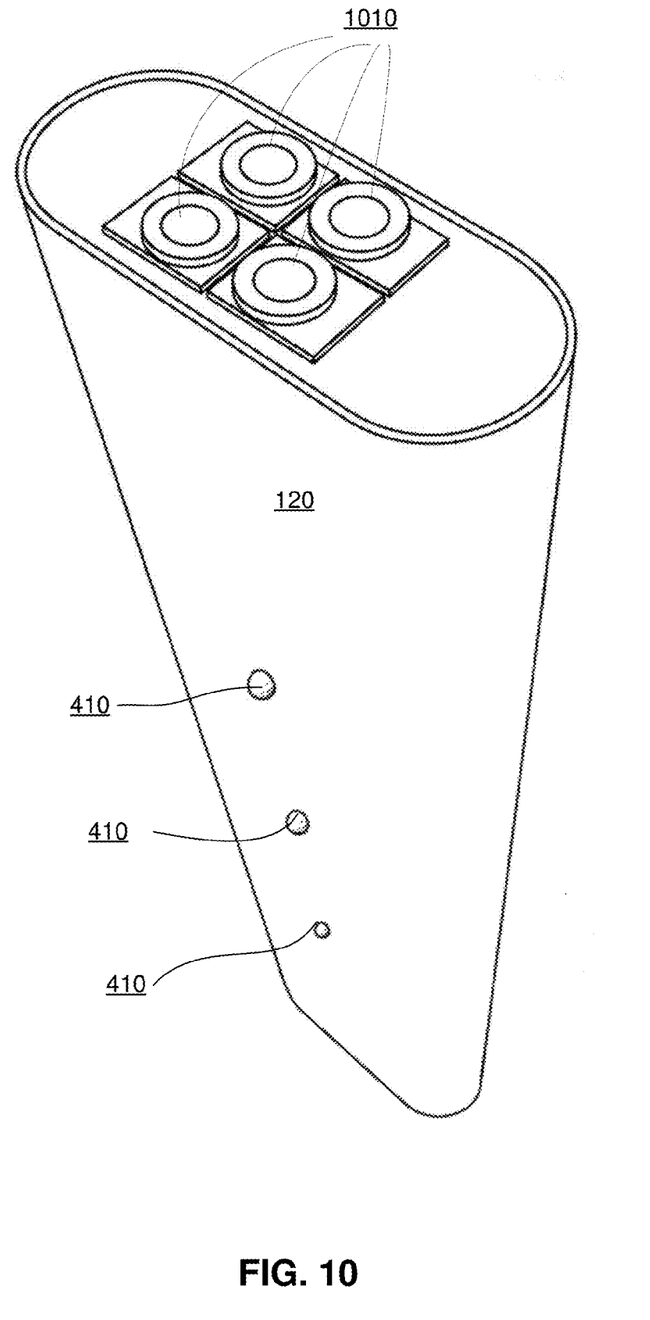
FIG. 10 is an exemplary view of pill format getters placed on an inner can of the vacuum insulated vessel.
Figure 11:
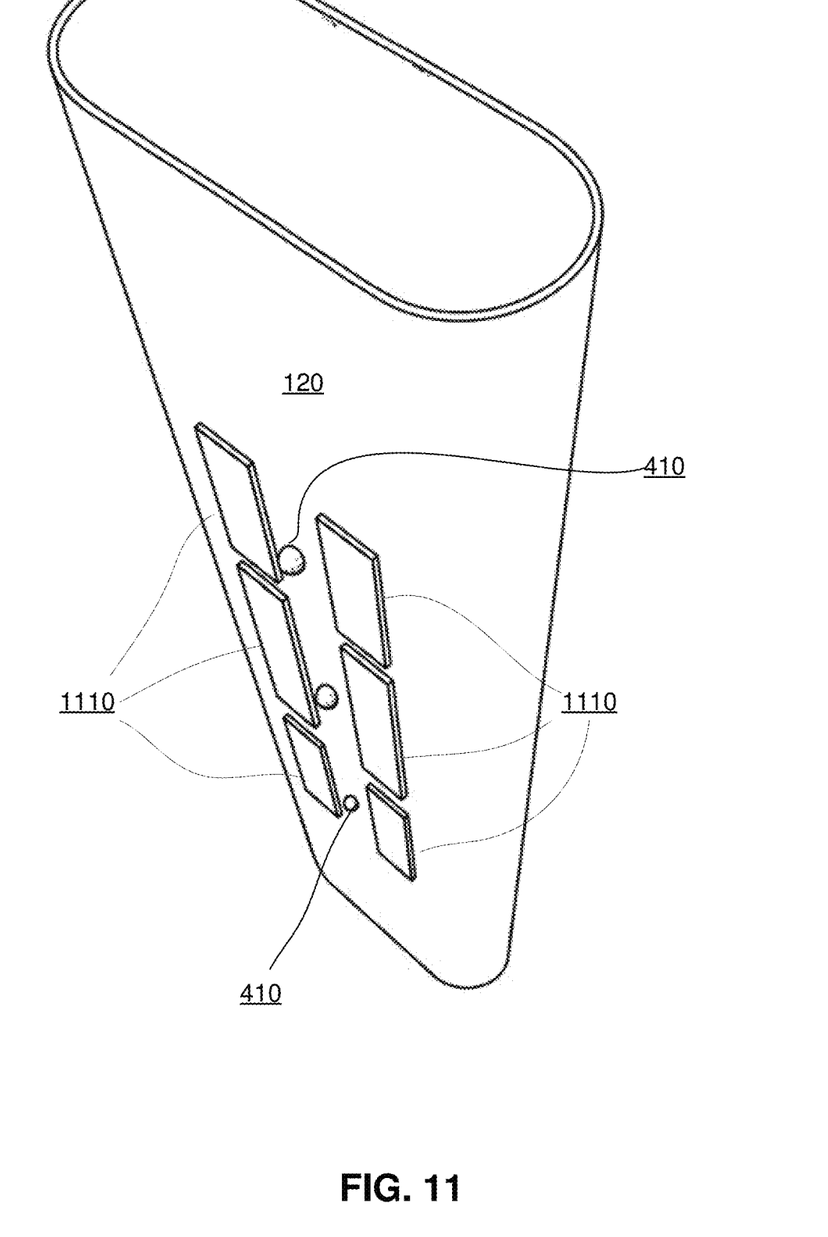
FIG. 11 is an exemplary view of plate format getters placed on an inner can of the vacuum insulated vessel.

Getters may be placed on the inner can 120 in two different formats, as depicted in FIGS. 10 and 11. Generally getters are activated by heating, and thus they can be mounted on the inner can 120 which is exposed to temperatures as high as 180-200 degrees Celsius, thus increasing the capacity of the getter. The format of the getters is dependent on the available space. In an exemplary embodiment, SEAS St 101 non-evaporable getters are used because they are compatible with the high temperatures of the brazing process.

FIG. 10 depicts "pill" format getters 1010, which are placed on the top of the inner can 120. In the pill format, the getter is sintered powder in a stainless steel cylinder. The pill shape allows for attachment onto the can with minimal welds necessary for attachment (in some embodiments, a pill getter 1010 only needs to be welded to the inner can 120 in one place). Pill getters are not very flat and can be three times a height of other formats, such as plate getters. Thus, in exemplary embodiments they are placed on a top surface of the inner can 120. However, in other embodiments, one or more pill getters 1010 may be placed at other locations on the can, instead of or in addition to, the top surface. While four pill getters 1010 are depicted in FIG. 10, there can be fewer or additional getters present.

FIG. 11 depicts plate format getters 1110, which are placed on one or both sides of the inner can 120. In the plate format, the getter is sintered powder coating a strip of material, such as stainless steel. The plate shape is very thin and can fit into very small cavities. Thus, in exemplary embodiments, plate getters 1110 are placed on the outer wall of the inner can 120, facing the cavity 170. However, in other embodiments, one or more plate getters 1110 may be placed at other locations on the can, instead of or in addition to, a side surface. Plate getters 1110 may need to be welded in multiple places to ensure that they lay flat on the side of the inner can 120.

Plate getters 1110 may have less capacity than pill getters 1010. Thus, more plate getters may need to be attached to the inner can 120 to achieve the same level of gas absorption. While six getters are shown in the exemplary embodiment of FIG. 11 on one side of the inner can 120, there can be fewer or additional getters present.

Method for Manufacturing Vacuum can

Figure 12:
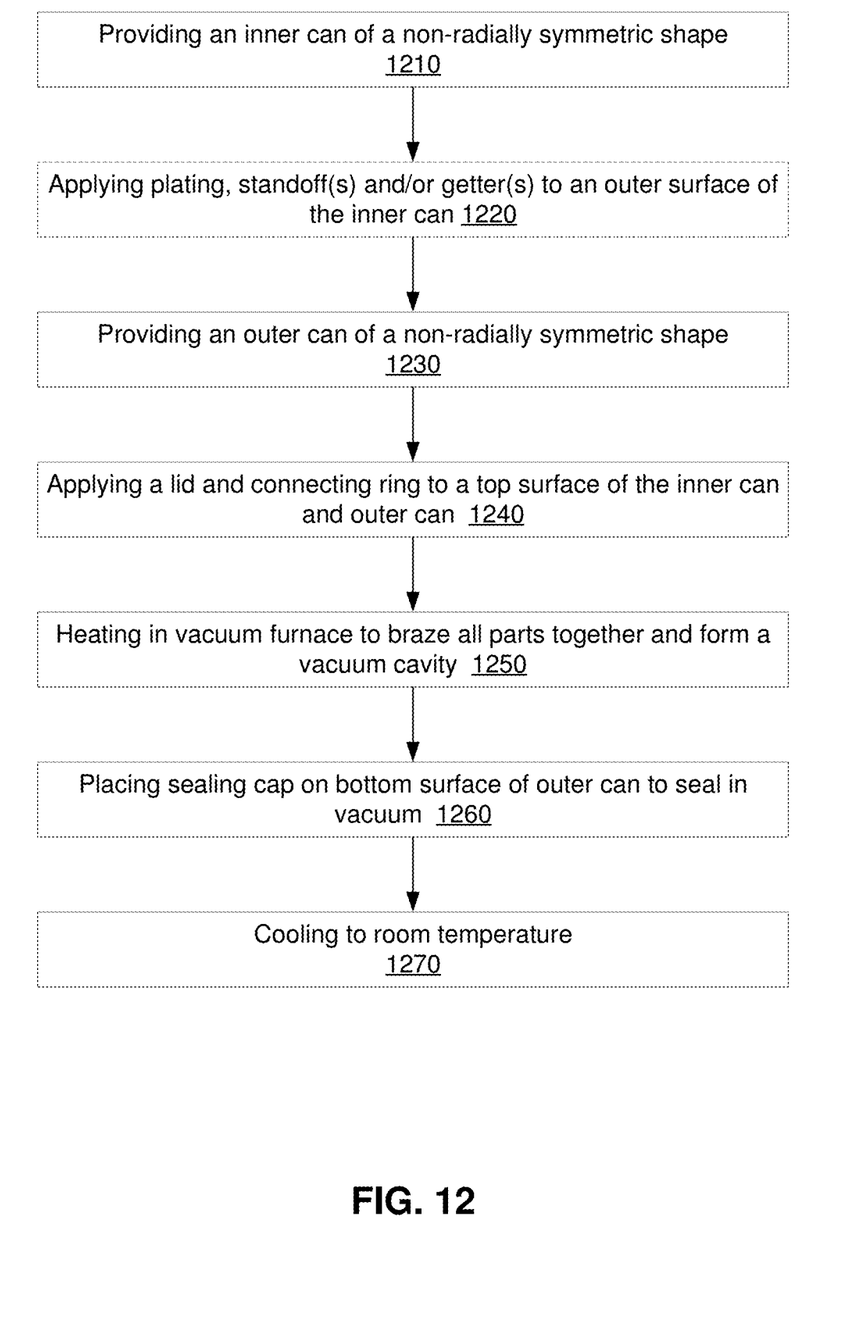
FIG. 12 is a flow diagram of an exemplary process for producing the vacuum insulated vessel.

FIG. 12 depicts an exemplary flowchart for a method for manufacturing the vacuum can 100. While the method is depicted in these concrete steps, additional steps may be added or steps removed without departing from this disclosure. In addition, some steps may occur concurrent or in a different order. In step 1210, a hollow inner can 120 is manufactured in a desired shape, such as a non-radially symmetric shape depicted in FIG. 2B. Optionally, the inner can may be wrapped in copper plating, have one or more standoffs applied to an outer surface, and/or have getters applied to an outer surface, in step 1220. The inner can may also have a fuel cartridge, heater, and/or other components placed within it.

An outer can 130 is then placed around the inner can 120 in step 1230. A connecting ring 150 and lid 140 may be placed on top, in step 1240. A hole can be punctured in a bottom surface of the outer can 130, with a sealing cap 180 placed on top.

The prepared pieces may be brazed in a furnace with a vacuum pump to remove all gases from inside of the furnace and the cavity 170, in step 1250. Heat is applied to a brazing temperature to seal the inner and outer cans to the connecting ring 150 and to seal the sealing cap 180 to the hole in the outer can, thus sealing in the vacuum in step 1260. In step 1270, vacuum can 100 is cooled to room temperature. For example, the container 100 is removed from the furnace and brought to room temperature.

While various methods and structures have been described herein, it should be understood that these methods can be used alone or in any combination to reduce heat loss from a vacuum insulated vessel used in a fuel cell system.

The flowchart and block diagrams in the Figures illustrate the architecture, functionality, and operation of possible implementations of systems and methods according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A lightweight vacuum insulated vessel for reducing heat loss, the vessel comprising:
   a hollow inner can of a non-radially symmetric shape and being a long aspect ratio cylindrical shape, the inner can comprising sides and a bottom surface;
   a hollow outer can of a non-radially symmetric shape and being the long aspect ratio cylindrical shape placed around the inner can, the outer can comprising sides and a bottom surface;
   a cavity formed between the inner can and the outer can, the cavity maintained at vacuum pressure;
   a lid covering a top of the inner can; and
   a connecting ring covering a top of the cavity, wherein the lid and the connecting ring together cover an entire top surface of the vacuum insulated vessel;
   wherein the inner can further comprises at least two thermally insulated spherical standoffs attached to an outer side surface of the inner can, the at least two thermally insulated spherical standoffs protruding into the cavity and providing support to a side wall of the outer can.

2. The vessel of claim 1, wherein the inner can further comprises a fuel cartridge for a fuel cell system.

3. The vessel of claim 1, wherein the inner can further comprises a heater.

4. The vessel of claim 1, wherein the inner can and the outer can are made from stainless steel.

5. The vessel of claim 1, wherein an outer side surface of the inner can and an outer bottom surface of the inner can are plated with copper.

6. The vessel of claim 1, wherein an inner side surface of the outer can and an inner bottom surface of the outer can are plated with copper.

7. The vessel of claim 1, wherein a weight of the vessel ranges from 150-315 grams.

8. The vessel of claim 1, wherein the inner can further comprises at least two getters attached to an outer side surface of the inner can, the at least two getters protruding into the cavity and absorbing gases to maintain vacuum pressure in the cavity.

9. The vessel of claim 1, wherein the inner can further comprises at least one getter attached to an outer top surface of the inner can, the at least one getter absorbing gases to maintain vacuum pressure in the vessel.

10. The vessel of claim 1, wherein a cross-sectional area of the inner can ranges from 45-90 mm$^2$.

11. The vessel of claim 1, wherein the inner can is 0.3-0.8 mm thick.

12. The vessel of claim 1, wherein the outer can is 0.3-0.8 mm thick.

13. A lightweight vacuum insulated vessel for reducing heat loss, the vessel comprising:
   a hollow inner can of a non-radially symmetric shape and being a long aspect ratio cylindrical shape, the inner can comprising sides and a bottom surface;
   a hollow outer can of a non-radially symmetric shape and being the long aspect ratio cylindrical shape placed around the inner can, the outer can comprising sides and a bottom surface;
   a cavity formed between the inner can and the outer can, the cavity maintained at vacuum pressure;
   a lid covering a top of the inner can; and
   a connecting ring covering a top of the cavity, wherein the lid and the connecting ring together cover an entire top surface of the vacuum insulated vessel;
   wherein the inner can further comprises at least two standoffs being zirconia ceramic balls attached to an outer side surface of the inner can, the at least two standoffs protruding into the cavity and providing support to a side wall of the outer can.

14. The vessel of claim 13, wherein the inner can further comprises a fuel cartridge for a fuel cell system.

15. The vessel of claim 13, wherein the inner can further comprises a heater.

16. The vessel of claim 13, wherein the inner can and the outer can are made from stainless steel.

17. The vessel of claim 13, wherein an outer side surface of the inner can and an outer bottom surface of the inner can are plated with copper.

18. The vessel of claim 13, wherein an inner side surface of the outer can and an inner bottom surface of the outer can are plated with copper.

19. The vessel of claim 13, wherein a weight of the vessel ranges from 150-315 grams.

20. The vessel of claim 13, wherein the inner can further comprises at least two getters attached to an outer side surface of the inner can, the at least two getters protruding into the cavity and absorbing gases to maintain vacuum pressure in the cavity.

* * * * *